US012620512B2

(12) United States Patent
Okuda et al.

(10) Patent No.: US 12,620,512 B2
(45) Date of Patent: May 5, 2026

(54) SOFT MAGNETIC POWDER AND MAGNETIC CORE

(71) Applicant: TDK CORPORATION, Tokyo (JP)

(72) Inventors: Nobuhiro Okuda, Tokyo (JP); Hiroyuki Matsumoto, Tokyo (JP); Kazuhiro Yoshidome, Tokyo (JP)

(73) Assignee: TDK CORPORATION, Tokyo (JP)

( * ) Notice: Subject to any disclaimer, the term of this patent is extended or adjusted under 35 U.S.C. 154(b) by 406 days.

(21) Appl. No.: 18/284,139

(22) PCT Filed: Feb. 25, 2022

(86) PCT No.: PCT/JP2022/008050
§ 371 (c)(1),
(2) Date: Sep. 26, 2023

(87) PCT Pub. No.: WO2022/209497
PCT Pub. Date: Oct. 6, 2022

(65) Prior Publication Data
US 2024/0177898 A1 May 30, 2024

(30) Foreign Application Priority Data
Mar. 29, 2021 (JP) ................................ 2021-055232

(51) Int. Cl.
*H01F 1/14* (2006.01)
*H01F 1/147* (2006.01)
*H01F 1/20* (2006.01)
*H01F 3/08* (2006.01)

(52) U.S. Cl.
CPC ............... *H01F 1/147* (2013.01); *H01F 1/20* (2013.01); *H01F 3/08* (2013.01)

(58) Field of Classification Search
CPC .... B22F 1/00; B22F 1/14; B22F 1/142; B22F 9/00; C22C 19/07; C22C 38/00; C22C 45/02; H01F 1/147; H01F 1/15325; H01F 1/20; H01F 3/08
See application file for complete search history.

(56) References Cited

U.S. PATENT DOCUMENTS

2018/0019043 A1 1/2018 Miura et al.
2020/0353536 A1 11/2020 Kanaya et al.

FOREIGN PATENT DOCUMENTS

CN 107610870 A 1/2018
JP 2002075721 * 3/2002
WO 2019/142610 A1 7/2019

OTHER PUBLICATIONS

May 17, 2022, International Search Report issued in International Patent Application No. PCT/JP2022/008050.

* cited by examiner

*Primary Examiner* — Nicholas A Wang
(74) *Attorney, Agent, or Firm* — OLIFF PLC.

(57) ABSTRACT

A soft magnetic powder includes Fe and Co. The total content of Fe and Co with respect to the soft magnetic powder overall is 90 mass % or greater. The Fe content with respect to the total content of Fe and Co is 30-95 mass %. The average particle diameter of the soft magnetic powder is 0.10-5.0 μm. The amount of oxygen on the surface of the soft magnetic powder is 0.010 $g/m^2$ or less. The true density of the soft magnetic powder with respect to the theoretical density of the soft magnetic powder is 90-99%.

5 Claims, 2 Drawing Sheets

SOFT MAGNETIC POWDER AND MAGNETIC CORE

TECHNICAL FIELD

The present invention relates to a soft magnetic powder and a magnetic core.

BACKGROUND

Patent Document 1 discloses an invention related to an Fe—Co alloy powder or the like having an average particle size of 0.25 to 0.80 μm. The Fe—Co alloy powder can achieve a high μ' at a high frequency band and is highly resistant to heat.

PRIOR ARTS

Patent Document

Patent Document 1: WO 2019-142610

SUMMARY OF INVENTION

Problem to be Solved by Invention

It is an object of the present invention to provide a soft magnetic powder used for manufacture of a magnetic core having a high relative permeability and high DC superimposition characteristics.

Means for Solving the Problem

To achieve the above object, a soft magnetic powder of the present invention is a soft magnetic powder comprising Fe and Co, wherein Fe and Co altogether constitute 90 mass % or more of the soft magnetic powder; Fe constitutes 30 mass % or more and 95 mass % or less of Fe and Co altogether;

the soft magnetic powder has an average particle size of 0.10 μm or more and 5.0 μm or less;

the soft magnetic powder has an oxygen content of 0.010 $g/m^2$ or less at a surface of the soft magnetic powder; and a ratio of a true density of the soft magnetic powder to a theoretical density of the soft magnetic powder is 90% or more and 99% or less.

The soft magnetic powder may further comprise a subcomponent, and the subcomponent may constitute 5 mass % or less of the soft magnetic powder.

The subcomponent may comprise at least one selected from the group consisting of B, Si, P, Cu, V, Ti, Zr, Hf, Nb, Ta, Mo, W, Cr, Ni, Al, Mn, Ag, Zn, S, Sn, As, Sb, Bi, N, O, and rare-earth elements.

The soft magnetic powder may have an average particle size of 0.1 μm or more and 1.0 μm or less.

A magnetic core of the present invention comprises the above soft magnetic powder.

DETAILED DESCRIPTION OF INVENTION

Figure 1:
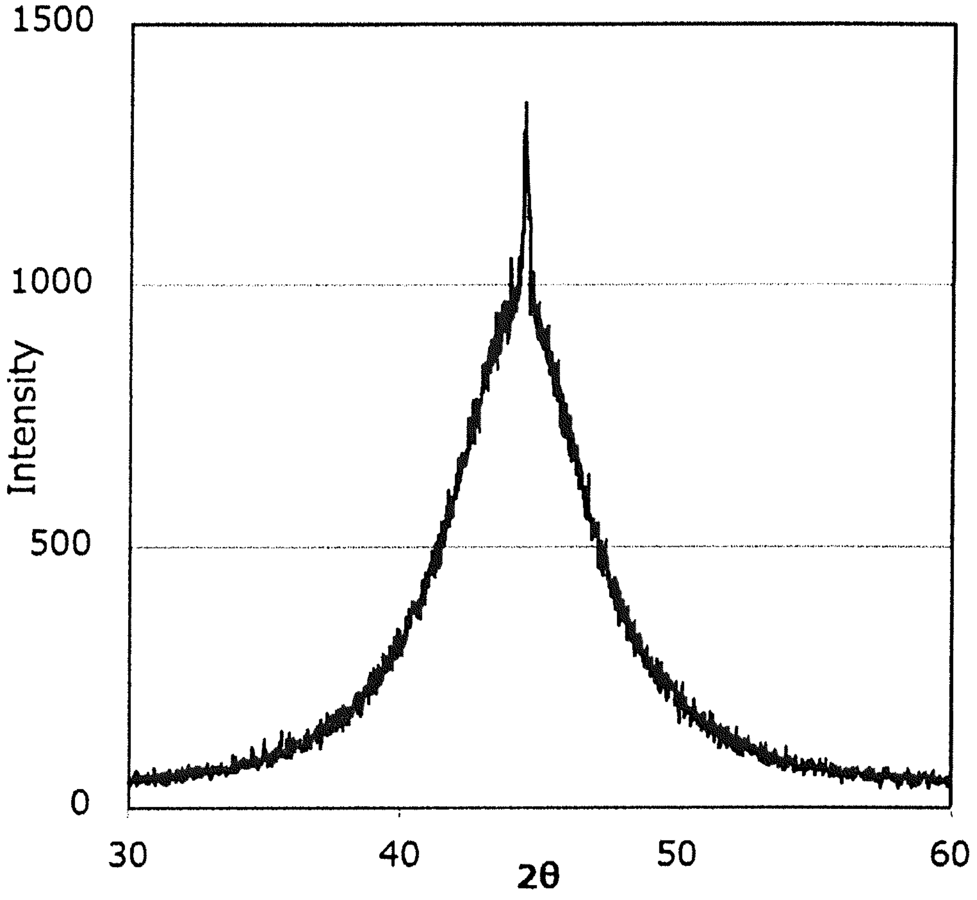
FIG. 1 is an example chart generated in an X-ray crystal structure analysis.

Hereinafter, the present invention will be described based on an embodiment.

(Magnetic Core)

A magnetic core according to the present embodiment includes a soft magnetic powder according to the present embodiment described later. More specifically, the magnetic core according to the present embodiment is produced using a mixture of a large-size powder and a small-size powder. The large-size powder is a soft magnetic powder having an average particle size exceeding 5.0 μm. The small-size powder is the soft magnetic powder according to the present embodiment described later having an average particle size of 5.0 μm or less. Soft magnetic particles included in the large-size powder and/or the small-size powder may be insulation coated.

When the magnetic core is produced using the mixture of the large-size powder and the small-size powder, the magnetic core readily has an improved packing density and an improved relative permeability, compared to when the magnetic core is produced using only the large-size powder or only the small-size powder. This is because voids between the soft magnetic particles of the large-size powder can be filled with the soft magnetic particles of the small-size powder.

The large-size powder may have any composition and any microstructure. The composition and the microstructure may be appropriately selected in accordance with the purpose or the like of the magnetic core. The microstructure of the large-size powder can be checked with XRD. The microstructure of the large-size powder can also be checked with a TEM.

When the large-size powder has an amorphous structure and when the large-size powder has a nanocrystalline structure, the magnetic core readily has an improved relative permeability and a decreased core loss.

An amorphous structure is a structure including only an amorphous solid or a hetero-amorphous structure. A hetero-amorphous structure is a structure in which initial fine crystals are present in an amorphous solid. The initial fine crystals may have any average crystal size. The average crystal size may be 0.3 nm or more and 10 nm or less. An amorphous structure has an amorphous ratio of 85% or more, which can be confirmed with XRD. Whether the large-size powder has an amorphous structure or a hetero-amorphous structure can be confirmed with a TEM. A nanocrystalline structure is a structure mainly including nanocrystals. In the crystalline (nanocrystalline) structure, the amorphous ratio, which can be confirmed with XRD, is less than 85%. Nanocrystals included in the nanocrystalline structure have an average crystal size of 5 nm or more and 100 nm or less.

In the present embodiment, a soft magnetic metal powder having an amorphous ratio X of 85% or more is deemed to have an amorphous structure or a hetero-amorphous structure, and a soft magnetic metal powder having an amorphous ratio X of less than 85% is deemed to have a crystalline structure, where the amorphous ratio X is represented by Formula 1 shown below.

$$X=100-(Ic/(Ic+Ia)\times 100) \qquad \text{Formula 1}$$

Ic: Crystal scattering integrated intensity

Ia: Amorphous scattering integrated intensity

The amorphous ratio X is calculated as follows. An X-ray crystal structure analysis of the soft magnetic metal powder using XRD is performed. In the analysis, phases are identified, and peaks (Ic: crystal scattering integrated intensity, Ia: amorphous scattering integrated intensity) of crystallized Fe or a crystallized compound are read. From the intensities of these peaks, the crystallization ratio is determined, and the amorphous ratio X is calculated using the above Formula 1. Hereinafter, the calculation method will be described more specifically.

Figure 2:
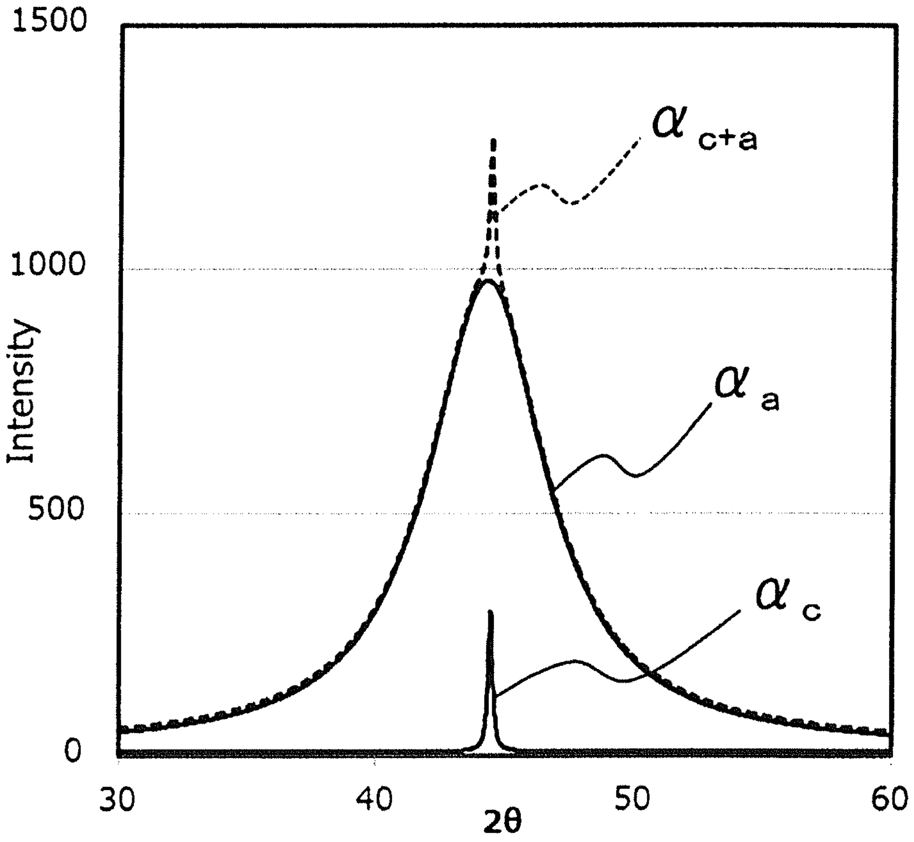
FIG. 2 is a plurality of example patterns obtained by profile fitting of the chart of FIG. 1.

The X-ray crystal structure analysis of the soft magnetic metal powder according the present embodiment is performed using XRD to generate a chart like the one shown as FIG. 1. Then, profile fitting is performed to this chart using a Lorentzian function shown as Formula 2 below to generate a crystal component pattern $\alpha_c$ showing the crystal scattering integrated intensity, an amorphous component pattern $\alpha_a$ showing the amorphous scattering integrated intensity, and a pattern $\alpha_{c+a}$ showing a combination of these patterns, as shown in FIG. 2. From the patterns of the crystal scattering integrated intensity and the amorphous scattering integrated intensity, the amorphous ratio X is calculated using the above Formula 1. Note that, the range of measurement is within a diffraction angle of 2θ=30° to 60° in which a halo derived from amorphousness can be confirmed. The difference between the actual integrated intensities measured using XRD and the integrated intensities calculated using the Lorentzian function is 1% or less in this range.

[Mathematical 1]

$$f(x) = \frac{h}{1 + \frac{(x-u)^2}{w^2}} + b \qquad (2)$$

h: Peak height
u: Peak position
w: Half width
b: Background height

When the soft magnetic alloy powder of the present embodiment includes nanocrystals, each particle includes multiple nanocrystals. That is, the particle size of the soft magnetic alloy powder described later and the crystal size of the nanocrystals are different.

In observation of a cross section of the magnetic core using SEM-EDS or the like, the soft magnetic particles of the large-size powder and the soft magnetic particles of the small-size powder can be distinguished. Specifically, the soft magnetic particles of the large-size powder and the soft magnetic particles of the small-size powder can be distinguished using difference in particle size in a SEM image. The soft magnetic particles of the large-size powder and the soft magnetic particles of the small-size powder may not be distinguishable in the SEM image, because the range of the particle size of the large-size powder and the range of the particle size of the small-size powder may overlap. In such a case, soft magnetic particles indistinguishable from each other in the SEM image can be distinguished in a composition analysis of such soft magnetic particles using EDS or the like.

In the cross section, the soft magnetic particles of the large-size powder preferably have an average equivalent circle diameter of above 5 μm and 50 μm or less; the soft magnetic particles of the small-size powder preferably have an average equivalent circle diameter of 0.1 μm or more and 5 μm or less; and the average equivalent circle diameter of the soft magnetic particles of the large-size powder is preferably 2.0 times or more and 100 times or less the average equivalent circle diameter of the soft magnetic particles of the small-size powder.

When the respective average equivalent circle diameters are within the above ranges, voids between the soft magnetic particles of the large-size powder can be effectively filled with the soft magnetic particles of the small-size powder. Thus, the packing density of the magnetic core is further readily improved, and the relative permeability of the magnetic core is further readily improved.

A coil component according to the present embodiment includes the magnetic core according to the present embodiment. The coil component may have any shape or the like. By including the magnetic core according to the present embodiment, the coil component according to the present embodiment can satisfy both high inductance and good DC superimposition characteristics.

(Soft Magnetic Powder)

The soft magnetic powder (the above-mentioned small-size powder) according to the present embodiment is a soft magnetic powder comprising Fe and Co, wherein Fe and Co altogether constitute 90 mass % or more of the soft magnetic powder;

Fe constitutes 30 mass % or more and 95 mass % or less of Fe and Co altogether;

the soft magnetic powder has an average particle size of 0.10 μm or more and 5.0 μm or less;

the soft magnetic powder has an oxygen content of 0.010 g/m$^2$ or less at a surface of the soft magnetic powder; and a ratio of a true density of the soft magnetic powder to a theoretical density of the soft magnetic powder is 90% or more and 99% or less.

The soft magnetic powder according to the present embodiment can be used for manufacture of a magnetic core having a high relative permeability and high DC superimposition characteristics. Specifically, the magnetic core produced using the mixture of the large-size powder and the small-size powder can have improved characteristics, where the large-size powder is the soft magnetic powder having an average particle size exceeding 5.0 μm and the small-size powder is the soft magnetic powder according to the present embodiment having an average particle size of 5.0 μm or less.

As described above, Fe and Co altogether constitute 90 mass % or more of the soft magnetic powder according to the present embodiment, and Fe constitutes 30 mass % or more and 95 mass % or less of Fe and Co altogether. That is, the soft magnetic powder according to the present embodiment mainly contains Fe and Co. By mainly containing Fe and Co, the soft magnetic powder according to the present embodiment has high saturation magnetization. Moreover, the DC superimposition characteristics of the magnetic core produced using the mixture of the large-size powder and the small-size powder (soft magnetic powder according to the present embodiment) can be improved.

When the Fe content is too low and when the Fe content is too high, saturation magnetization is readily decreased. Moreover, the DC superimposition characteristics of the magnetic core produced using the mixture of the large-size powder and the small-size powder (soft magnetic powder whose Fe content falls outside the above range) are decreased.

The soft magnetic powder according to the present embodiment may further contain a subcomponent in addition to Fe and Co. The subcomponent may include at least one selected from the group consisting of B, Si, P, Cu, V, Ti, Zr, Hf, Nb, Ta, Mo, W, Cr, Ni, Al, Mn, Ag, Zn, S, Sn, As, Sb, Bi, N, O, and rare-earth elements or may include at least one selected from the group consisting of V, Cr, Ni, and Sm. The rare-earth elements include Sc, Y, and lanthanide. By containing the above subcomponent, the soft magnetic powder according to the present embodiment can have its workability, corrosion resistance, and saturation magnetization controlled. In terms of workability, the soft magnetic powder preferably contains 2 mass % or more of the above subcomponent in total. Moreover, in terms of the magnetic properties and corrosion resistance of the soft magnetic powder, the soft magnetic powder preferably contains 10 mass % or less of the above subcomponent in total. Further, in terms of saturation magnetization of the soft magnetic powder, the soft magnetic powder preferably contains 5 mass % or less of the above subcomponent in total.

The soft magnetic powder according to the present embodiment may contain elements other than the above elements (Fe, Co, B, Si, P, Cu, V, Ti, Zr, Hf, Nb, Ta, Mo, W, Cr, Ni, Al, Mn, Ag, Zn, S, Sn, As, Sb, Bi, N, O, and rare-earth elements) as inevitable impurities. The soft magnetic powder (100 mass %) may contain 1 mass % or less of the inevitable impurities. The soft magnetic powder may contain 10 mass % or less of the subcomponent and the inevitable impurities in total.

The soft magnetic powder according to the present embodiment has an oxygen content of 0.010 $g/m^2$ or less at the surface of the soft magnetic powder. The oxygen content at the surface per unit area changes in accordance with the degree to which the surface of the soft magnetic powder is oxidized. When the oxygen content at the surface is too high, the DC superimposition characteristics of the magnetic core produced using the mixture of the large-size powder and the small-size powder (soft magnetic powder according to the present embodiment) are readily decreased.

The soft magnetic powder according to the present embodiment may have an average particle size of 0.10 μm or more and 1.0 μm or less. When the soft magnetic powder according to the present embodiment has an average particle size of 0.10 μm or more and 1.0 μm or less, the packing density and the relative permeability of the magnetic core produced using the mixture of the large-size powder and the small-size powder (soft magnetic powder according to the present embodiment) are readily improved.

(Method of Manufacturing the Soft Magnetic Powder)

The soft magnetic powder according to the present embodiment can be produced by producing a soft magnetic powder with a known method and further reducing the soft magnetic powder using a mechanochemical reduction method.

Any method of producing the soft magnetic powder prior to reduction using the mechanochemical reduction method may be used. For example, an atomization method (e.g., a water atomization method and a gas atomization method) may be used to produce the soft magnetic powder. Also, a synthesis method (e.g., a CVD method) using at least one selected from vaporization, reduction, and thermal decomposition of a metal salt may be used to produce the soft magnetic powder. Also, an electrolytic method or a carbonyl method may be used to produce the soft magnetic powder.

By changing manufacturing conditions of the soft magnetic powder in the above methods of manufacturing the soft magnetic powder, some powder particles included in the soft magnetic powder become hollow particles. Hollow particles are particles having an empty space inside. Because some powder particles included in the soft magnetic powder become the hollow particles, the ratio of the true density of the soft magnetic powder to the theoretical density thereof is 99% or less. The hollow particles may be destroyed after the powder is manufactured. The ratio of the true density of the soft magnetic powder whose hollow particles are destroyed to the theoretical density thereof gets closer to 100%. However, uniformity of a magnetic core produced using the soft magnetic powder whose hollow particles are destroyed is decreased. Additionally, due to decrease in uniformity of the magnetic core produced using the soft magnetic powder whose hollow particles are destroyed, the DC superimposition characteristics of the magnetic core are impaired. Also, the magnetic core including the hollow particles readily has good DC superimposition characteristics.

For example, when the atomization method is used to produce the soft magnetic powder among the above methods of manufacturing the soft magnetic powder, the number of hollow particles changes in accordance with atomizing conditions, particularly the water pressure and the gas pressure at the time of atomization. The higher the water pressure or the gas pressure at the time of atomization, the larger the number of hollow particles, and the lower the ratio of the true density of the soft magnetic powder to the theoretical density thereof. When the soft magnetic powder is produced by the atomization method under unsuitable atomizing conditions (e.g., an excessively high water pressure or an excessively high gas pressure at the time of atomization), the ratio of the true density of the soft magnetic powder to the theoretical density thereof falls below 90%. When the ratio of the true density of the soft magnetic powder to the theoretical density thereof is less than 90%, permeability is decreased. This is because, when the ratio of the true density of the soft magnetic powder to the theoretical density thereof is less than 90%, the magnetic flux flow in the magnetic core is obstructed.

At this time, the soft magnetic powder may be classified so that the average particle size of the soft magnetic powder is controlled to an intended value. Any classification method may be used. To control the average particle size to approximately 0.3 μm or more, swirling airflow classification is suitably used. To control the average particle size to approximately less than 0.3 μm, differential electrostatic classification is suitably used.

Reducing the resulting soft magnetic powder by the mechanochemical reduction method can produce the soft magnetic powder according to the present embodiment.

Hereinafter, the mechanochemical reduction method will be described.

As a method of reducing the soft magnetic powder, a reduction method using a heat treatment for hydrogen reduction is known.

However, when the reduction method using the heat treatment for hydrogen reduction is used to reduce the soft magnetic powder, unfortunately the soft magnetic powder is readily agglomerated. When the soft magnetic powder is excessively agglomerated, the ratio of the true density of the soft magnetic powder to the theoretical density thereof is excessively decreased. Consequently, even when a magnetic core is produced using the soft magnetic powder reduced by the reduction method using the heat treatment for hydrogen reduction, the packing density of the magnetic core does not sufficiently increase, and the relative permeability thereof does not sufficiently increase.

The mechanochemical reduction method is a reduction method in which a mechanofusion apparatus is applied to reduction of the soft magnetic powder. The mechanofusion apparatus has conventionally been an apparatus used for a coating treatment of various powders. The present inventors have found that use of the mechanofusion apparatus for reduction of the soft magnetic powder enables reduction of the soft magnetic powder to suitably proceed while agglomeration of the soft magnetic powder is prevented.

In the mechanochemical reduction method, first, the inside of the mechanofusion apparatus is provided with a hydrogen atmosphere. Then, the soft magnetic powder prior to reduction is introduced into a rotating rotor. Then, the rotor is rotated while a gap between an inner wall surface of the rotating rotor and a press head and the number of rotations of the rotating rotor are controlled.

Due to rotations of the rotating rotor, friction between the soft magnetic powder and the inner wall surface of the rotating rotor locally increases the temperature of the soft magnetic powder. While the temperature of the soft magnetic powder is locally increased, the soft magnetic powder is reduced. Consequently, in the reduction using the mechanochemical reduction method, grinding of the agglomerated soft magnetic powder and reduction of the soft magnetic powder are carried out simultaneously. Thus, reduction of the soft magnetic powder can suitably proceed while agglomeration of the soft magnetic powder is prevented.

The smaller the number of rotations of the rotating rotor, the more difficult it is for the reduction of the soft magnetic powder to suitably proceed. Consequently, the soft magnetic powder has a high oxygen content at its surface. Also, the larger the number of rotations of the rotating rotor, the easier it is for the hollow particles included in the soft magnetic powder to be destroyed.

The smaller the gap between the inner wall surface of the rotating rotor and the press head, the more difficult it is for the soft magnetic powder to be agglomerated, and the lower the oxygen content of the soft magnetic powder at its surface. However, the smaller the gap between the inner wall surface of the rotating rotor and the press head, the easier it is for the powder particles, particularly the above hollow particles, included in the soft magnetic powder to be destroyed. Consequently, the ratio of the true density of the soft magnetic powder to the theoretical density thereof becomes too high. Further, due to destruction of the hollow particles, the proportion of powder particles having an elongated shape becomes too large. Consequently, the DC superimposition characteristics of the magnetic core produced using the mixture of the large-size powder and the small-size powder (soft magnetic powder having too high a ratio of the true density to the theoretical density) are readily decreased.

The larger the gap between the inner wall surface of the rotating rotor and the press head, the easier it is for the soft magnetic powder to be agglomerated. This is because grinding of the agglomerated soft magnetic powder does not readily proceed. Consequently, grinding of the agglomerated soft magnetic powder is insufficient. Thus, voids between powder particles remain, and the ratio of the true density of the soft magnetic powder to the theoretical density thereof becomes too low. Moreover, the DC superimposition characteristics of the magnetic core produced using the mixture of the large-size powder and the small-size powder (soft magnetic powder having too low a ratio of the true density to the theoretical density) are readily decreased.

(Method of Manufacturing the Magnetic Core)

Any method of manufacturing the magnetic core according to the present embodiment may be used as long as a step of mixing the large-size powder and the small-size powder (soft magnetic powder according to the present embodiment) is included. After the large-size powder and the small-size powder are mixed, a known method may be used to produce the magnetic core according to the present embodiment. For example, after the large-size powder and the small-size powder are mixed, the mixture may be kneaded with a thermosetting resin to give a resin compound; a mold may be filled with the resin compound; press molding may be performed; and the resin may be hardened by heating to produce the magnetic core (dust core) according to the present embodiment.

The magnetic core according to the present embodiment may be used for any purpose. For example, the magnetic core may be used for coil components, such as inductors, choke coils, and transformers. In particular, when the magnetic core according to the present embodiment is used for a coil component, the coil component satisfies both high inductance and good DC superimposition characteristics.

EXAMPLES

Hereinafter, the present invention will be described based on more detailed examples, but the present invention is not limited to the examples.

First, materials of pure metals such as Fe, Co, and a subcomponent were weighed so that a mother alloy having a composition described in Tables 1 to 5 could be produced. After a chamber was vacuumed, the materials were melted by high-frequency heating to give the mother alloy.

Then, the mother alloy was heated at 1500° C. for melting. Using a high-pressure water atomization method, a soft magnetic powder having a composition shown in Tables 1 to 5 was produced. Next, classification was performed to give a powder having an average particle size shown in Tables 1 to 5. To produce a powder having an average particle size of 0.30 μm or more, a swirling airflow-driven air classifier (Aerofine Classifier manufactured by NISSHIN ENGINEERING INC.) was used for classification. To produce a powder having an average particle size of less than 0.30 μm, an electrostatic classifier (Model 3082 manufactured by TSI) was used for classification.

Next, the classified soft magnetic powder was mechanochemically reduced. A mechanofusion apparatus (AMS-Lab manufactured by HOSOKAWA MICRON CORPORATION) was prepared. Then, the inside of the mechanofusion apparatus was provided with a hydrogen atmosphere. Then, the classified soft magnetic powder was introduced into a rotating rotor of the mechanofusion apparatus, and the rotating rotor was rotated. At this time, the number of rotations of the rotating rotor and the gap between an inner wall surface of the rotating rotor and a press head were as shown in Tables 1 to 5.

Using a laser diffraction particle size distribution analyzer (HELOS&RODOS manufactured by Sympatec GmbH), it was confirmed that the resulting soft magnetic powder had an average particle size (D50) shown in Tables 1 to 5.

The oxygen content at a surface of the soft magnetic powder per unit area was measured with TC6600 manufactured by LECO Corporation.

The saturation magnetization of the soft magnetic powder was measured with a vibrating sample magnetometer (VSM-3S-15 manufactured by Toei Industry Co., Ltd.) at an external magnetic field of 795.8 kA/m (10 kOe). The saturation magnetization was deemed good at 1.80 T or more and better at 2.20 T or more.

The reason why the saturation magnetization was deemed better at 2.20 T or more was that, conventionally, the upper limit of both the saturation magnetization of a pure iron powder used as the small-size powder and the saturation magnetization of a permalloy powder used as the small-size powder was about 2.15 T.

The true density of the soft magnetic powder was measured by an Archimedes method using a Wardon type pycnometer. The theoretical density of the soft magnetic powder was calculated using the composition of the soft magnetic powder. Then, the ratio of the true density to the theoretical density was calculated.

Next, the soft magnetic powder (small-size powder) was mixed with another soft magnetic powder (large-size powder), and a magnetic core was produced.

As the another soft magnetic powder mentioned above (the large-size powder), an Fe—Si—Cr—B—C based soft magnetic powder (KUAMET 6B2 manufactured by EPSON ATMIX CORPORATION) was prepared. The Fe—Si—Cr—B—C based soft magnetic powder had an average particle size (D50) of 23 μm and had an amorphous structure.

Then, the large-size powder and the small-size powder were mixed at a mass ratio of 80:20. The mixture of the soft magnetic powders was kneaded with an epoxy resin to produce a resin compound. The mixture of the soft magnetic powders constituted 2.5 mass % of the resin compound in mass ratio. The epoxy resin was YSLV-80XY manufactured by NIPPON STEEL Chemical & Material Co., Ltd.

A predetermined toroidal mold was filled with the resin compound. Then, a molding pressure was controlled so that a toroidal core obtained in the end would have a packing density of about 80%, to produce a molded body. Specifically, the molding pressure was controlled within a range of 1 to 10 ton/cm$^2$. Then, the resin included in the molded body was hardened by heating at 180° C. for 60 minutes to give the toroidal core (having an outer diameter of 11 mm, an inner diameter of 6.5 mm, and a thickness of 2.5 mm).

The packing density η of the soft magnetic powder in the toroidal core was calculated by dividing the density of the toroidal core calculated using the dimensions and mass of the toroidal core by the theoretical density of the toroidal core calculated using the relative densities of the various materials.

The relative permeability of the toroidal core was calculated using the inductance of the dust core measured at a frequency of 100 kHz using an LCR meter (4284A manufactured by Agilent Technologies) and a DC bias power supply (42841A manufactured by Agilent Technologies). The relative permeability at a DC superimposed magnetic field of 0 A/m was defined as μ0, and the relative permeability at a DC superimposed magnetic field of 8000 A/m was defined as μ8k. When μ0 was 40 or more, μ0 was deemed good. When μ8k was 30 or more, μ8k was deemed good. Then, μ8k/μ0 was calculated. The higher the value of μ8k/μ0, the better the DC superimposition characteristics.

TABLE 1

| Sample No. | Example/ Comparative Example | Subcomponent Element | Subcomponent Content (Mass %) | $Fe_xCo_{100-x}$ (Mass ratio) x | Mechanochemical reduction conditions: Number of rotor rotations (rpm) | Mechanochemical reduction conditions: Gap between rotor and press head (mm) | Powder characteristics: Average particle size (μm) | Powder characteristics: Oxygen content (g/m$^2$) |
|---|---|---|---|---|---|---|---|---|
| 1 | Comparative Example | None | 0 | 25 | 1600 | 3 | 0.60 | 0.005 |
| 2 | Example | None | 0 | 30 | 1600 | 3 | 0.60 | 0.005 |
| 2a | Example | None | 0 | 38 | 1600 | 3 | 0.60 | 0.005 |
| 3 | Example | None | 0 | 50 | 1600 | 3 | 0.60 | 0.005 |
| 4 | Example | None | 0 | 65 | 1600 | 3 | 0.60 | 0.005 |
| 5 | Example | None | 0 | 75 | 1600 | 3 | 0.60 | 0.005 |
| 6 | Example | None | 0 | 95 | 1600 | 3 | 0.60 | 0.005 |
| 7 | Comparative Example | None | 0 | 96 | 1600 | 3 | 0.60 | 0.005 |

| Sample No. | Example/ Comparative Example | Powder characteristics: Saturation magnetization (T) | Powder characteristics: True density/ Theoretical density (%) | Core characteristics: Packing density η (%) | Core characteristics: Permeability μ0 (0 A/m) | Core characteristics: DC superimposition characteristics μ8k (8 kA/m) | Core characteristics: DC superimposition characteristics μ8k/μ0 |
|---|---|---|---|---|---|---|---|
| 1 | Comparative Example | 2.15 | 98 | 80 | 50 | 29 | 0.58 |
| 2 | Example | 2.20 | 98 | 80 | 50 | 30 | 0.60 |
| 2a | Example | 2.24 | 98 | 80 | 50 | 31 | 0.62 |
| 3 | Example | 2.30 | 98 | 80 | 50 | 33 | 0.66 |
| 4 | Example | 2.40 | 98 | 80 | 50 | 35 | 0.70 |
| 5 | Example | 2.30 | 98 | 80 | 50 | 33 | 0.66 |
| 6 | Example | 2.20 | 98 | 80 | 50 | 30 | 0.60 |
| 7 | Comparative Example | 2.15 | 98 | 80 | 50 | 29 | 0.58 |

TABLE 2

| Sample No. | Example/ Comparative Example | Subcomponent Element | Subcomponent Content (Mass %) | $Fe_xCo_{100-x}$ (Mass ratio) x | Mechanochemical reduction conditions: Number of rotor rotations (rpm) | Mechanochemical reduction conditions: Gap between rotor and press head (mm) | Powder characteristics: Average particle size (μm) | Powder characteristics: Oxygen content (g/m$^2$) |
|---|---|---|---|---|---|---|---|---|
| 11 | Comparative Example | None | 0 | 65 | 1600 | 1 | 0.60 | 0.004 |
| 12 | Example | None | 0 | 65 | 1600 | 2 | 0.60 | 0.005 |
| 4 | Example | None | 0 | 65 | 1600 | 3 | 0.60 | 0.005 |
| 13 | Example | None | 0 | 65 | 1600 | 4 | 0.60 | 0.006 |
| 14 | Example | None | 0 | 65 | 1600 | 5 | 0.60 | 0.007 |
| 15 | Comparative Example | None | 0 | 65 | 1600 | 6 | 0.60 | 0.008 |

| Sample No. | Example/ Comparative Example | Powder characteristics: Saturation magnetization (T) | Powder characteristics: True density/ Theoretical density (%) | Core characteristics: Packing density η (%) | Core characteristics: Permeability μ0 (0 A/m) | DC superimposition characteristics: μ8k (8 kA/m) | DC superimposition characteristics: μ8k/μ0 |
|---|---|---|---|---|---|---|---|
| 11 | Comparative Example | 2.40 | 100 | 80 | 50 | 29 | 0.58 |
| 12 | Example | 2.40 | 99 | 80 | 50 | 32 | 0.64 |
| 4 | Example | 2.40 | 98 | 80 | 50 | 35 | 0.70 |
| 13 | Example | 2.40 | 94 | 79 | 45 | 37 | 0.82 |
| 14 | Example | 2.39 | 90 | 79 | 40 | 35 | 0.88 |
| 15 | Comparative Example | 2.38 | 88 | 78 | 38 | 33 | 0.87 |

TABLE 3

| Sample No. | Example/ Comparative Example | Subcomponent Element | Subcomponent Content (Mass %) | $Fe_xCo_{100-x}$ (Mass ratio) x | Mechanochemical reduction conditions: Number of rotor rotations (rpm) | Mechanochemical reduction conditions: Gap between rotor and press head (mm) | Powder characteristics: Average particle size (μm) | Powder characteristics: Oxygen content (g/m$^2$) |
|---|---|---|---|---|---|---|---|---|
| 21 | Comparative Example | None | 0 | 65 | 1600 | 3 | 0.05 | 0.005 |
| 22 | Example | None | 0 | 65 | 1600 | 3 | 0.10 | 0.005 |
| 23 | Example | None | 0 | 65 | 1600 | 3 | 0.40 | 0.005 |
| 4 | Example | None | 0 | 65 | 1600 | 3 | 0.60 | 0.005 |
| 24 | Example | None | 0 | 65 | 1600 | 3 | 0.80 | 0.005 |
| 25 | Example | None | 0 | 65 | 1600 | 3 | 1.0 | 0.005 |
| 26 | Example | None | 0 | 65 | 1600 | 4 | 3.0 | 0.005 |
| 27 | Example | None | 0 | 65 | 1600 | 5 | 5.0 | 0.005 |
| 28 | Comparative Example | None | 0 | 65 | 1600 | 5 | 6.0 | 0.005 |

| Sample No. | Example/ Comparative Example | Powder characteristics: Saturation magnetization (T) | Powder characteristics: True density/ Theoretical density (%) | Core characteristics: Packing density η (%) | Core characteristics: Permeability μ0 (0 A/m) | DC superimposition characteristics: μ8k (8 kA/m) | DC superimposition characteristics: μ8k/μ0 |
|---|---|---|---|---|---|---|---|
| 21 | Comparative Example | 2.40 | 94 | 79 | 37 | 33 | 0.89 |
| 22 | Example | 2.40 | 98 | 80 | 43 | 35 | 0.81 |
| 23 | Example | 2.40 | 98 | 80 | 47 | 36 | 0.77 |
| 4 | Example | 2.40 | 98 | 80 | 50 | 35 | 0.70 |
| 24 | Example | 2.40 | 98 | 80 | 49 | 35 | 0.71 |

TABLE 3-continued

| | | | | | | | |
|---|---|---|---|---|---|---|---|
| 25 | Example | 2.40 | 98 | 80 | 48 | 35 | 0.73 |
| 26 | Example | 2.40 | 97 | 80 | 45 | 35 | 0.78 |
| 27 | Example | 2.40 | 97 | 80 | 40 | 34 | 0.85 |
| 28 | Comparative Example | 2.40 | 97 | 80 | 38 | 33 | 0.87 |

TABLE 4

| | | | | | Mechanochemical reduction conditions | | Powder characteristics | |
|---|---|---|---|---|---|---|---|---|
| | | Subcomponent | | | | | | |
| Sample No. | Example/ Comparative Example | Element | Content (Mass %) | $Fe_xCo_{100-x}$ (Mass ratio) x | Number of rotor rotations (rpm) | Gap between rotor and press head (mm) | Average particle size (μm) | Oxygen content (g/m$^2$) |
| 31a | Example | None | 0 | 65 | 2000 | 3 | 0.60 | 0.005 |
| 4 | Example | None | 0 | 65 | 1600 | 3 | 0.60 | 0.005 |
| 31 | Example | None | 0 | 65 | 1000 | 3 | 0.60 | 0.010 |
| 32 | Comparative Example | None | 0 | 65 | 500 | 3 | 0.60 | 0.012 |

| | | Powder characteristics | | Core characteristics | | | |
|---|---|---|---|---|---|---|---|
| | | | | | | DC superimposition characteristics | |
| Sample No. | Example/ Comparative Example | Saturation magnetization (T) | True density/ Theoretical density (%) | Packing density η (%) | Permeability μ0 (0 A/m) | μ8k (8 kA/m) | μ8k/μ0 |
| 31a | Example | 2.40 | 99 | 80 | 50 | 32 | 0.64 |
| 4 | Example | 2.40 | 98 | 80 | 50 | 35 | 0.70 |
| 31 | Example | 2.20 | 98 | 80 | 45 | 30 | 0.67 |
| 32 | Comparative Example | 2.00 | 98 | 80 | 40 | 29 | 0.73 |

TABLE 5

| | | | | | Mechanochemical reduction conditions | | Powder characteristics | |
|---|---|---|---|---|---|---|---|---|
| | | Subcomponent | | | | | | |
| Sample No. | Example/ Comparative Example | Element | Content (Mass %) | $Fe_xCo_{100-x}$ (Mass ratio) x | Number of rotor rotations (rpm) | Gap between rotor and press head (mm) | Average particle size (μm) | Oxygen content (g/m$^2$) |
| 3 | Example | None | 0 | 50 | 1600 | 3 | 0.60 | 0.005 |
| 41 | Example | V | 2 | 50 | 1600 | 3 | 0.60 | 0.005 |
| 42 | Example | V | 5 | 51 | 1600 | 3 | 0.60 | 0.005 |
| 43 | Example | V | 10 | 50 | 1600 | 3 | 0.60 | 0.005 |
| 2a | Example | None | 0 | 38 | 1600 | 3 | 0.60 | 0.005 |
| 44 | Example | Ni | 2 | 38 | 1600 | 3 | 0.60 | 0.005 |
| 45 | Example | Ni | 5 | 37 | 1600 | 3 | 0.60 | 0.005 |
| 46 | Example | Ni | 10 | 37 | 1600 | 3 | 0.60 | 0.005 |
| 3 | Example | None | 0 | 50 | 1600 | 3 | 0.60 | 0.005 |
| 47 | Example | Cr | 2 | 50 | 1600 | 3 | 0.60 | 0.004 |
| 48 | Example | Cr | 5 | 51 | 1600 | 3 | 0.60 | 0.004 |
| 49 | Example | Cr | 10 | 50 | 1600 | 3 | 0.60 | 0.004 |
| 4 | Example | None | 0 | 65 | 1600 | 3 | 0.60 | 0.005 |
| 50 | Example | Sm | 3 | 65 | 1600 | 3 | 0.60 | 0.007 |
| 51 | Example | Sm | 5 | 65 | 1600 | 3 | 0.60 | 0.007 |
| 52 | Example | Sm | 10 | 67 | 1600 | 3 | 0.60 | 0.007 |

TABLE 5-continued

| Sample No. | Example/ Comparative Example | Powder characteristics: Saturation magnetization (T) | Powder characteristics: True density/ Theoretical density (%) | Core characteristics: Packing density η (%) | Core characteristics: Permeability μ0 (0 A/m) | DC superimposition characteristics: μ8k (8 kA/m) | DC superimposition characteristics: μ8k/μ0 |
|---|---|---|---|---|---|---|---|
| 3 | Example | 2.30 | 98 | 80 | 50 | 33 | 0.66 |
| 41 | Example | 2.35 | 98 | 80 | 49 | 34 | 0.69 |
| 42 | Example | 2.20 | 98 | 80 | 49 | 30 | 0.61 |
| 43 | Example | 1.90 | 98 | 80 | 40 | 30 | 0.75 |
| 2a | Example | 2.24 | 98 | 80 | 50 | 31 | 0.62 |
| 44 | Example | 2.22 | 98 | 80 | 51 | 34 | 0.67 |
| 45 | Example | 2.20 | 98 | 80 | 50 | 30 | 0.60 |
| 46 | Example | 1.90 | 98 | 80 | 41 | 30 | 0.73 |
| 3 | Example | 2.30 | 98 | 80 | 50 | 33 | 0.66 |
| 47 | Example | 2.35 | 98 | 80 | 49 | 34 | 0.69 |
| 48 | Example | 2.20 | 98 | 80 | 49 | 30 | 0.61 |
| 49 | Example | 1.90 | 98 | 80 | 40 | 30 | 0.75 |
| 4 | Example | 2.40 | 98 | 80 | 50 | 35 | 0.70 |
| 50 | Example | 2.30 | 98 | 80 | 51 | 33 | 0.65 |
| 51 | Example | 2.20 | 98 | 80 | 49 | 30 | 0.61 |
| 52 | Example | 1.90 | 98 | 80 | 40 | 30 | 0.75 |

Table 1 shows Examples and Comparative Examples in which conditions were the same except that the Fe content was changed. The soft magnetic powder (small-size powder) of the Examples in which Fe constituted 30 mass % or more and 95 mass % or less of Fe and Co altogether had a high saturation magnetization and a high ratio of the true density to the theoretical density. Moreover, when the core was produced using the mixture of the small-size powder and the large-size powder, the core had high μ8 k and high DC superimposition characteristics. In contrast, the soft magnetic powder (small-size powder) of the Comparative Example in which the Fe content was too low had lower saturation magnetization than other Examples. Moreover, when the core was produced using the mixture of the small-size powder and the large-size powder, the core had low μ8 k and low DC superimposition characteristics. Additionally, the soft magnetic powder (small-size powder) of the Comparative Example in which the Fe content was too high had lower saturation magnetization than other Examples. Moreover, when the core was produced using the mixture of the small-size powder and the large-size powder, the core had low μ8 k and low DC superimposition characteristics.

Table 2 shows Examples and Comparative Examples in which conditions were the same as in Sample No. 4 of Table 1 except that the gap between the inner wall surface of the rotating rotor and the press head was changed. The smaller the gap between the inner wall surface of the rotating rotor and the press head, the higher the ratio of the true density of the soft magnetic powder to the theoretical density thereof, and the lower the oxygen content at the surface. Moreover, when the core was produced using the mixture of the soft magnetic power (small-size powder) having a ratio of the true density to the theoretical density within a predetermined range and the large-size powder, the core had a good relative permeability and good DC superimposition characteristics. In contrast, in the Comparative Example having too high a ratio of the true density to the theoretical density, the core had low μ8 k and low DC superimposition characteristics. In the Comparative Example having too low a ratio of the true density to the theoretical density, the core had low μ0.

Table 3 shows Examples and Comparative Examples in which conditions were the same as in Sample No. 4 of Table 1 except that the average particle size of the soft magnetic powder was changed and that the gap between the inner wall surface of the rotating rotor and the press head was changed so that the oxygen content at the surface of the soft magnetic powder would not change despite the change of the average particle size. When the core was produced using the mixture of the soft magnetic power (small-size powder) having an average particle size within a predetermined range and the large-size powder, the core had a high packing density, a good relative permeability, and good DC superimposition characteristics. In contrast, when the average particle size was small or large, the ratio of the true density of the soft magnetic powder to the theoretical density thereof was low, and the packing density and relative permeability of the core were low.

Table 4 shows Examples and a Comparative Example in which conditions were the same as in Sample No. 4 of Table 1 except that the number of rotations of the rotating rotor was changed. The smaller the number of rotations of the rotating rotor, the higher the oxygen content at the surface of the soft magnetic powder, and the lower the saturation magnetization. Moreover, when the core was produced using the mixture of the soft magnetic power (small-size powder) having an oxygen content within a predetermined range at the surface and the large-size powder, the core had a good relative permeability and good DC superimposition characteristics. In contrast, in the Comparative Example having too high an oxygen content at the surface, the core had low μ8 k and low DC superimposition characteristics.

Table 5 shows Examples in which conditions were the same as in Sample No. 2a, Sample No. 3, or Sample No. 4 of Table 1 except that a subcomponent was added. When the core was produced using the mixture of the soft magnetic power (small-size powder) having a composition, an average particle size, an oxygen content at the surface, and a ratio of the true density to the theoretical density all within the predetermined ranges and the large-size powder, the core had a good relative permeability and good DC superimposition characteristics. Note that the soft magnetic powder (small-size powder) containing 5 mass % or less of the subcomponent had higher saturation magnetization than the soft magnetic powder (small-size powder) produced under substantially the same conditions except that the powder contained more than 5 mass % of the subcomponent.

The invention claimed is:

1. A soft magnetic powder comprising Fe and Co, wherein

Fe and Co altogether constitute 90 mass % or more of the soft magnetic powder;

Fe constitutes 30 mass % or more and 95 mass % or less of Fe and Co altogether;

the soft magnetic powder has an average particle size of 0.10 μm or more and 5.0 μm or less;

the soft magnetic powder has an oxygen content of 0.010 $g/m^2$ or less at a surface of the soft magnetic powder; and a ratio of a true density of the soft magnetic powder to a theoretical density of the soft magnetic powder is 90% or more and 99% or less.

2. The soft magnetic powder according to claim 1 further comprising a subcomponent, wherein the subcomponent constitutes 5 mass % or less of the soft magnetic powder.

3. The soft magnetic powder according to claim 2, wherein the subcomponent comprises at least one selected from the group consisting of B, Si, P, Cu, V, Ti, Zr, Hf, Nb, Ta, Mo, W, Cr, Ni, Al, Mn, Ag, Zn, S, Sn, As, Sb, Bi, N, O, and rare-earth elements.

4. The soft magnetic powder according to claim 1, wherein the soft magnetic powder has an average particle size of 0.1 μm or more and 1.0 μm or less.

5. A magnetic core comprising the soft magnetic powder according to claim 1.

* * * * *